United States Patent [19]
Hoffmeister

[11] 3,967,741
[45] July 6, 1976

[54] DEVICE FOR MOVING FUEL ELEMENTS AND CONTROL BARS FROM ONE PLACE TO ANOTHER PLACE IN A CORE REACTOR

[75] Inventor: Bernhard Hoffmeister, Wilhelmshaven, Germany

[73] Assignee: Fried. Krupp Gesellschaft mit beschränkter Haftung, Essen, Germany

[22] Filed: Feb. 3, 1975

[21] Appl. No.: 546,773

[30] Foreign Application Priority Data
Feb. 15, 1974 Germany............................ 2407228

[52] U.S. Cl................................. 214/27; 176/30; 176/36 R; 214/18 N
[51] Int. Cl.²......................................... G21C 19/10
[58] Field of Search .............. 214/18 N, 27; 176/30, 176/31, 32, 36 R

[56] References Cited
UNITED STATES PATENTS
3,039,949  6/1962  Newton et al. ........................ 214/27
3,580,804  5/1971  Paget ............................ 214/18 N X Primary Examiner—Albert J. Makay
Attorney, Agent, or Firm—Walter Becker

[57] ABSTRACT

A device, including a gripper, for manipulation of fuel elements and control bars, or rods, in a core reactor in which a vertical mast is provided in which the gripper is nonrotatably reciprocable. The mast is rotatable on a work platform and latch elements are provided to halt the mast in selected rotated positions on the platform. Abutment means are also provided to limit the rotary movement of the mast on the platform to 360°.

11 Claims, 6 Drawing Figures

DEVICE FOR MOVING FUEL ELEMENTS AND CONTROL BARS FROM ONE PLACE TO ANOTHER PLACE IN A CORE REACTOR

The present invention relates to a device for moving fuel elements and control bars from one place to another place in a core reactor with a guiding mast which extends through a recess of a movable working platform and rests on the latter by means of a turntable with vertical axis of rotation, said device also comprising a gripper body which within the guiding mast is so guided that it can be lifted and lowered and takes part in the rotation of the guiding mast.

It is an object of the present invention to provide a device of the above mentioned type which will make it possible precisely to adjust the guiding mast in certain rotary positions, for instance, in four positions offset relative to each other by an angle of 90° and to do this in an easy and danger-free manner.

More specifically, the present invention relates to a device as set forth in the preceding paragraph which will prevent the guiding mast from being turned in one or the other direction by more than 360°, which in turn in excess of 360° could have a harmful twisting of the lifting cables and supply conduits. Moreover, care is also to be taken that the guiding mast will always be precisely vertical.

These and other objects and advantages of the invention will appear more clearly from the following specification, in connection with the accompanying drawings, in which.

Figure 5:
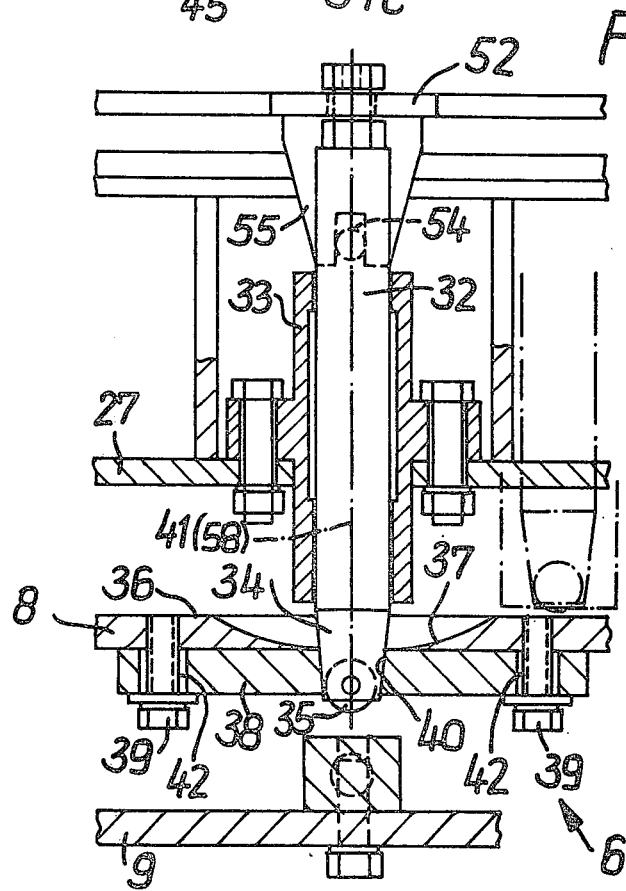
Figure 4:
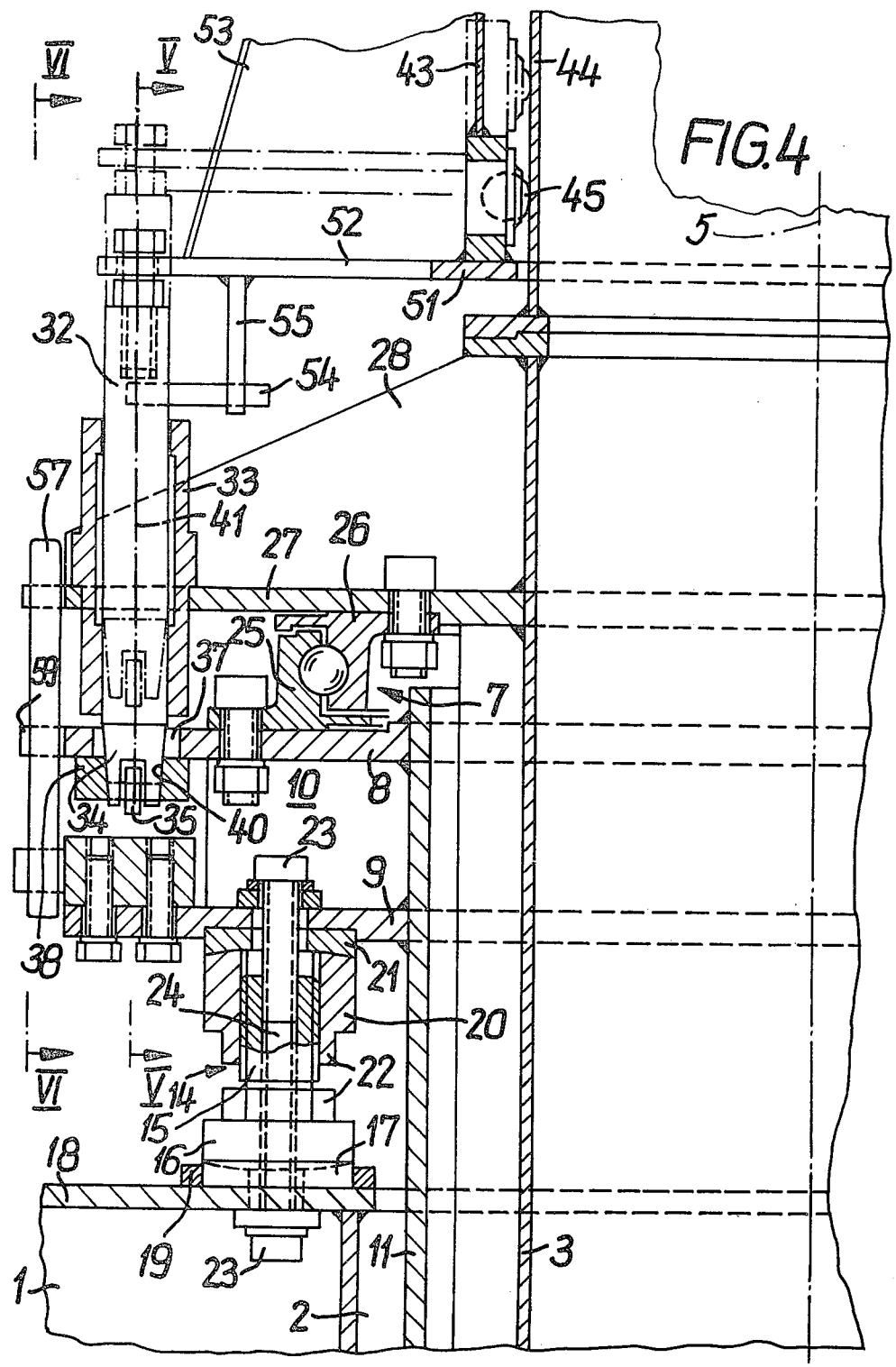
FIG. 4 illustrates on a larger scale than FIGS. 1 and 2, a detail of FIG. 2.

FIGS. 5 and 6 respectively illustrate sections taken along the line V—V and VI—VI of FIG. 4.

The device according to the present invention is characterized primarily in that a first latching body displaceably guided in vertical direction on the guiding mast and taking part in the rotary movements thereof can be lowered to such an extent that it rests on a second latching body which is firmly connected to the platform, while an intermediate element facilitating its rotary movement and located on one of the two latching bodies engages a surface of the path of the other latching body, and is furthermore characterized in that the first mentioned latching body during the rotation of the guiding mast each time when said guiding mast approaches certain rotary positions will, depending on the depressions in the surface of the path, drop further until the two latching bodies will at certain rotary positions engage each other positively.

Referring now to the drawings in detail, the platform 1 forms the trolley of a traveling crane which is adapted to move above the core, the settling tank, and a mounting frame for fuel elements and control bars. The platform 1 has a circular recess 2 within which there is provided a pipe system 3 forming a component of the guiding mast 4 and having a considerably smaller diameter than the recess 2. The center line of said pipe system 3 extends vertically and coincides with the axis of rotation of the guiding mast 4.

The guiding mast 4 is supported by the platform 1 through the intervention of a supporting ring 6 and a ball turntable. The supporting ring 6 comprises two horizontally superimposed annular flanges 8, 9 and has ribs 10 arranged therebetween. The flanges 8 and 9 are at their inner rim sections welded to a sheet metal cylinder 11 which extends downwardly through recess 2 in spaced relationship to said pipe system 3. Mounted on the lower end of the pipe system 3 which protrudes downwardly from the recess 2, there is provided an annular dish 12 for collecting soil and grease. This dish is surrounded by a ring 13 of elastic material.

The supporting ring 6 is, by means of three supports 14, adjustable as to height carried by the working platform 1, said supports 14 being uniformly distributed around the recess 2. Each of these supports is formed by a threaded bolt 15 having a head 16 at the lower end of bolt 15. This head 16 forms a spherical segment which is received by a ball cup or socket. This cup or socket 17 rests on the upper closure sheet metal plate of the box-shaped working platform 1. Its position is secured by a ring 19 surrounding same, which ring is welded toward the sheet metal plate 18. The threaded bolt 15 is screwed into a nut 20 which at its upper side forms a spherical segment. Resting on said spherical segment is a socket 21 which is fittingly inserted into a recess at the bottom side of the annular flange 9. By turning the threaded bolt 15 or the nut 20, the supporting height of the supports 14 can be changed. To this end, it is possible by means of fixed spanners to engage hexagonal sections 22 of the threaded bolt 15 and of nut 20. By adjusting the three supports 14, the supporting ring 6 may be so adjusted that the axis of rotation 5 of the guiding mast is precisely vertical.

After completion of the adjustment, the threaded bolts 15 are tensioned relative to the covering sheet metal plate 18, and the nut 20 is tensioned relative to the annular flange 9. This is effected by means of screw bolts 23 which by means of their heads and through the intervention of discs rests against the closure plate 18 or annular flange 9 through wide bores in the closure plate 18, the annular flange 9, and the sockets 17, 21 and are screwed into a threaded bore 24 of the threaded bolt 15.

The ball turntable 7 has a ring 25 which is screwed onto the upper annular flange 8 and has a ring 26 which is connected to one annular plate 27 protruding from the pipe system 3 and more specifically, is connected to the bottom side of plate 27. The annular plate 27 is reinforced relative to the pipe system 3 by ribs 28,29.

Figure 1:
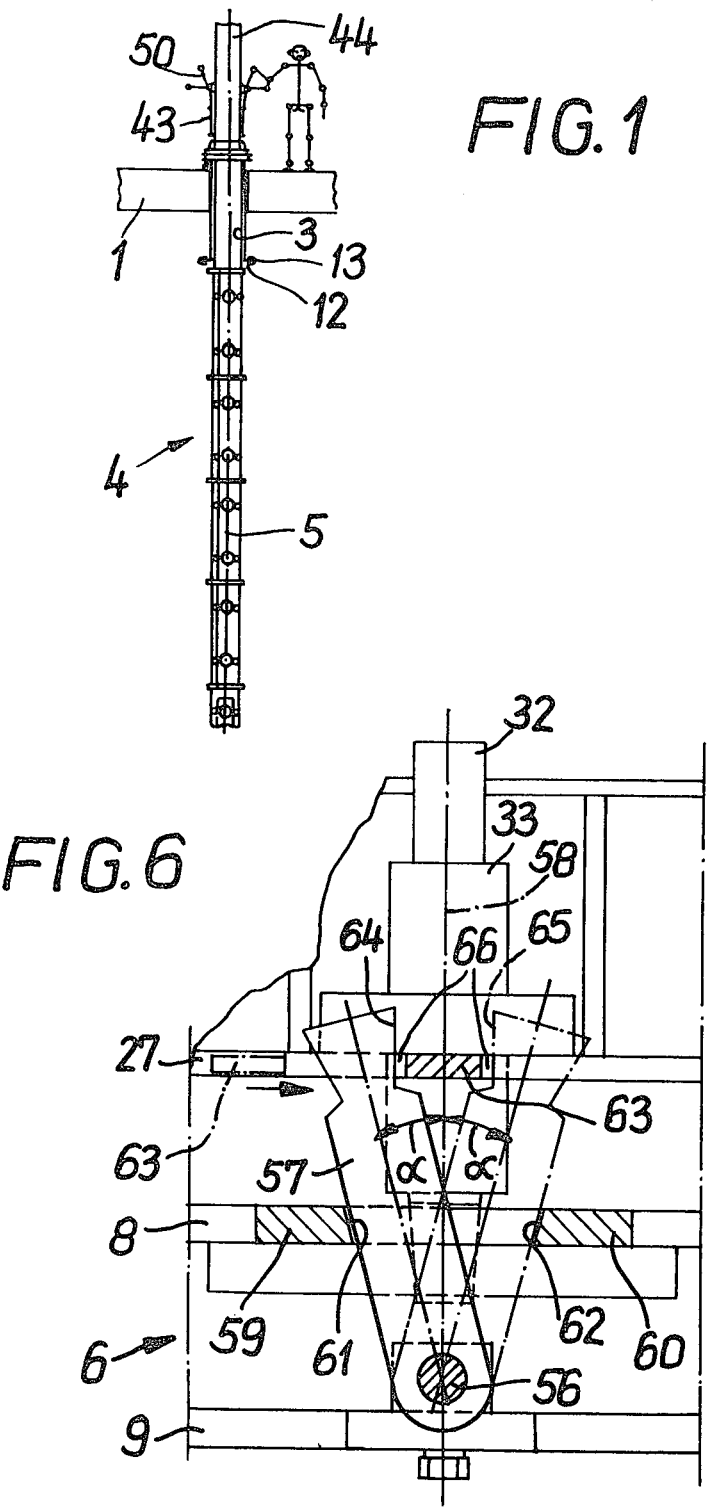
FIG. 1 is a section through a part of a device for moving fuel elements and control bars from one place to another place, said section being taken through the axis of the guiding mast.
Figure 2:
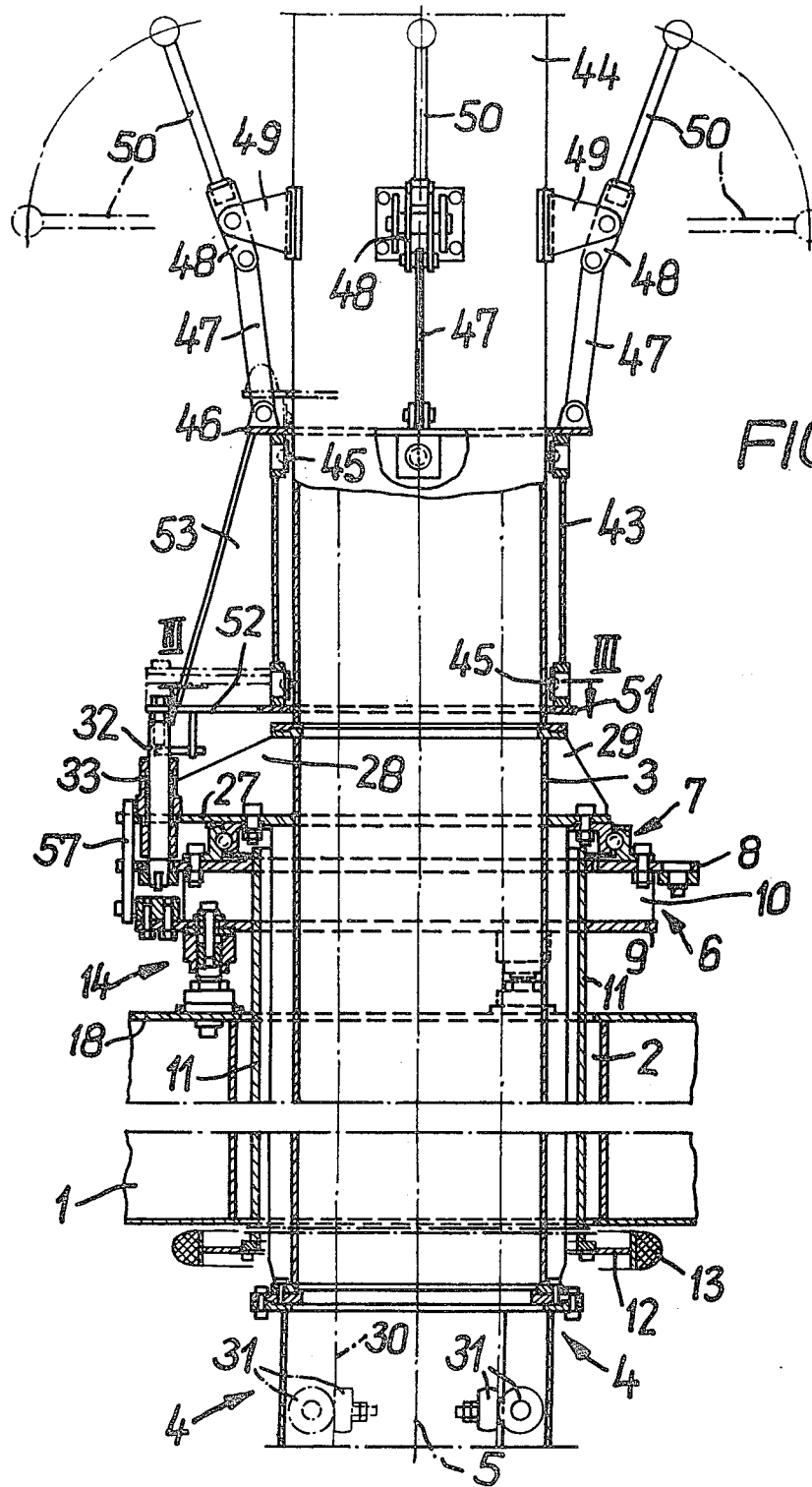
FIG. 2 illustrates on a larger scale than that of FIG. 1 an axial section through a portion of the working platform and the guiding mast.
Figure 3:
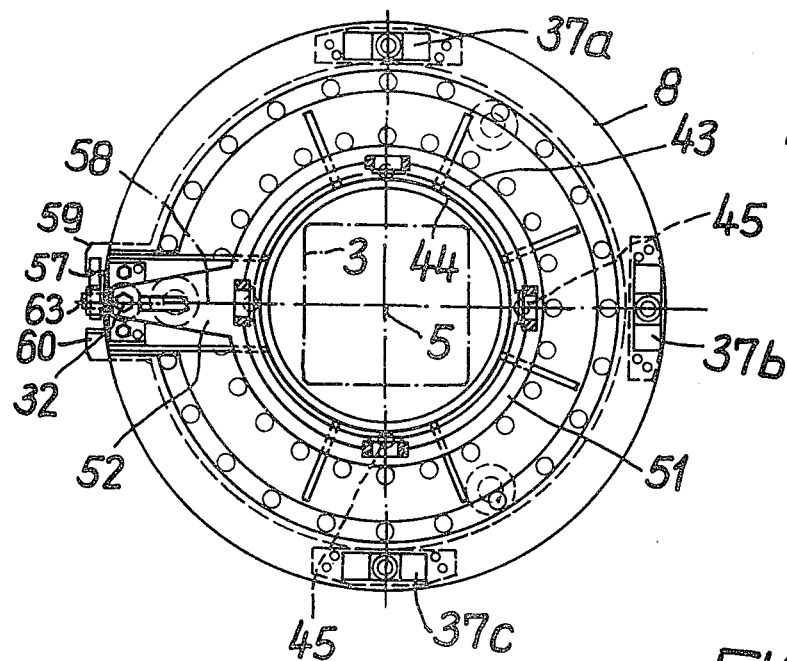
FIG. 3 represents a section taken along the line III—III of FIG. 2.

Within the guiding mast 4 there is provided a gripper body which in FIGS. 2 and 3 is indicated by dot-dash lines and has a square-shaped cross section adapted to be guided in vertical direction. For purposes of guiding there are provided roller pairs 31 which in pairs are mounted at different levels in the interior of the guiding mast and on both sides of two diagonally oppositely located edges of the gripper body 30 engage prismatic guiding plates of the gripper body. Through the intervention of rollers 31, the gripper body 30 is, during the rotation of the guiding mast about axis 5, likewise rotated, so that by rotation of the guiding mast, also a fuel element or control bar suspended on the gripper body is rotated.

In conformity with the illustrated embodiment, four rotary positions are provided for the guiding mast 4. These rotary positions are obtained by turning the guiding mast each time about 90°. In each of these rotary positions, the guiding mast 4 is adapted to be stopped and held.

To this end, an adjusting bolt 32 is mounted in a sleeve 33 which is located in an extension of the annular plate 27 and is displaceable in vertical direction. The lower end 34 of the arresting bolt 32 tapers downwardly in the form of a truncated cone. In one slot of the end 34 there is mounted a roller 35 with an axis of rotation which is located radially with regard to the vertical axis 5. This roller can rest on a path surface 36 on the top side of the lower annular flange 8 as is indicated in FIG. 5 by dot-dash lines. Within the regions of the positions of the arresting bolts 32 which positions correspond to the above mentioned four rotary positions of the guiding mast, is the surface 36 interrupted by troughs 37, 37a, 37b and 37c in the annular flange 8.

In each of these regions, at the bottom side there is arranged a flat bar 38 which is connected by screws 39 to the annular flange 8. The flat bar 38 has a conical bore 40 in its center, into which bore the lower end 34 of the arresting bolt fits. The flat bar 38 has to be so adjusted that the center line 41 of the conical bore 40 coincides with the vertical center line of the arresting bolt, when the guiding mast occupies the respective rotary position. The aligning of the flat bar is made possible by the fact that the screws 39 are passed through bores 42 of the flat bar 38 with considerable play.

For purposes of lifting the arresting bolt 32, the following device may be used.

A sleeve 43 extends around a pipe system 44 which at its upper end engages the pipe system 3. Sleeve 43 is mounted on the pipe system 44 by means of balls 45 which make it possible that the sleeve can be pushed upwardly and downwardly. Sleeve 43 is at its top closed by a ring 46 engaged by four links 47 uniformly distributed over the circumference of said ring. The upper ends of the links are pivotally connected to four two-arm levers 48 which are mounted in supports 49 on the pipe system 44 by means of joints having horizontal axes. At those ends of the two-arm lever 48 which face away from the links 47 there are provided long handles 50.

From a ring 51 which closes the sleeve 43 at the bottom there extends an arm 52 outwardly in radial direction, said arm 52 being reinforced by a rib 53. At the end of this arm, the arresting bolt 32 is connected at its upper end. In order to prevent the arresting bolt 32 from turning about its axis, and accordingly, to hold the roller 35 in its running track on the circular surface 38, a pivot 54 projecting above the sleeve 33 from the adjusting bolt 32 extends into a fork-shaped opening of an arm 55 which extends downwardly from a connecting area at the bottom side of arm 52.

Heavy lines in FIGS. 2, 4 and 6 illustrate the arresting bolt 32 in its lowermost position. In this connection, its lower end 34 is fittingly inserted into the conical bore 44 of the flat bar 38. Accordingly, the guiding mast 4 is arrested in one of the four above mentioned rotary positions. Accordingly, the sleeve 43 occupies its lower end position. The handles 50 are likewise mounted so as to point steeply upwardly.

When the guiding mast is to be turned out of this rotary position, the handles 50 are shifted downwardly to their nearly horizontal position which is indicated in FIG. 2 by dot-dash lines. Consequently, the sleeve 43 is lifted, and the arresting bolt 32 is pulled upwardly within the sleeve 33. The lower end 34 of the bolt 32 moves out of the conical bore 40 and passes into the dot-dash line position illustrated in FIG. 4 within the sleeve 33. The guiding mast 4 can now be turned by the operator standing on the platform 1 and, more specifically, can be turned by means of the handles 50. If, in this connection, sleeve 33 with the arresting bolt 32 has left the region of the groove 37, the handles 50 may be released. Consequently, the sleeve 43 moves downwardly until the roller 35 hits the track 36. During a further rotation of the guiding mast, consequently, the roller 35 rolls on the track 36.

When the guiding mast after a rotation by 90° is again to be arrested, roller 35 is allowed to move into the next trough 37a (FIG. 3). In this connection, the arresting bolt 32 is lowered due to its weight and the weight of sleeve 34 in conformity with the profile of the trough 37a. The profile is connected with a nearly upward tilting of the handles 50 so that the operator will visualize that the guiding mast 4 approaches its new rotary position.

Therefore, the guiding mast 4 will continue a slow rotation only until the lower end 34 of the arresting bolt at the bottom of sleeve 37 enters the conical bores 40a of this mold 37a. The guiding mast 4 will then be latched in its new rotary position.

If, however, the serviceman wants to turn the guiding mast 4 by an angle in excess of 90°, the operator has to lift the arresting bolt 32 within the region of the trough 37a by depressing one of the handles 50. In this way, the operator can selectively arrest the guiding mast in one of the four rotary positions with which troughs 37a, 37b, 37c and 37 are associated. However, care is taken that the guiding mast 4 cannot be turned by more than 360° in either one of the two directions. To this end, the following device is provided.

At the rim of the lower annular flange 9 there is mounted a lever 57 of a flat steel, said lever 57 being pivotally mounted by a joint bolt 56, the axis of which, extends radially with regard to the vertical axis of rotation 5. The arrangement is such that the axis of the joint bolt 56 is located in the meridian plane 58 which extends through the center line 41 of the adjusting bolt when the latter occupies its position shown in FIG. 5, which position corresponds to a rotary position of the guiding mast, while the joint bolt 56 is adapted by means of its lower end 34 to latch in the conical bore 40 of the flat bar 38.

The arresting lever 57 extends from the joint bolt 56 upwardly and through the space between the two abutments 59, 60 which project from the rim of the upper annular flange 8. As will be evident from FIG. 6, the abutments 59 and 60 limit the pivot movements of the lever 57, which lever can be pivoted from the meridian plane 58 by equal angles $\alpha$ toward both sides until the lever 57 abuts inclined abutment surfaces 61, 62 of the abutments 59, 60. When the guiding mast 4 occupies the above mentioned starting rotary position, an extension 63 projecting from the rim of the annular plate 27 and arranged symmetrically with regard to the meridian plane 58 is located centrally in the intermediate chamber between the end positions of the lever 57 which are indicated by solid and by dot-dash lines. This lever 57 is at its upper end provided on both sides with notches so that the small surface 64, 65 facing the extension 63 of the respective notch is located parallel to the meridian plane 58. Between the surfaces 64 and 65 and the side surfaces of the extension 63 there exists a slight play 66.

When starting from the rotary position of the guiding mast according to FIGS. 2 – 6, the guiding mast is rotated in counter-clockwise direction (as seen from above), the extension 63 moves away from the lever 47 and, more specifically, from the left-hand end position of FIG. 7 toward the right.

When the guiding mast has been rotated by nearly 360°, the extension 63 indicated in FIG. 6 with dot-dash lines, will during its further movement toward the right abut the left-hand flank of the upper end of the lever shown in solid lines. During a further rotation of the guiding mast, the lever 57 is carried along by the extension 63 so that the lever moves into its FIG. 6 blocking position illustrated by dot-dash lines, in which blocking position the lever 57 engages the abutment surface 62 of the abutment 60. The extension 63 has then reached the position shown in FIG. 6 in solid lines. Consequently, the guiding mast 4 could, if desired, be rotated by the play 66 in the same direction. Beyond this, however, the blocking lever 57 prevents the guiding mast from rotation.

When subsequently the guiding mast is rotated in the opposite direction by 360°, it carries along the blocking lever from its FIG. 6 position and moves it into the dot-dash line position so that said blocking lever moves into its left-hand blocking position in which it engages the abutment surface 61 of the abutment 59. Consequently, the guiding mast can, with the exception of the slight play 66, not be turned further, in other words, practically by not more than 360°.

As will be evident from the above, the present invention yields the advantage that an operator from the working platform can easily turn the guiding mast so as it is necessary when moving the fuel elements and controlling bars in view of different burnt-off sections, while in view of precisely maintaining certain rotary angles, for instance, of 90° it will be assured that the fuel elements or control bars suspended on the gripper body can, following the rotation, be inserted into the narrow receiving openings of the core, or of a bearing frame.

It is, of course, to be understood that the present invention is, by no means, limited to the specific showing in the drawings, but also comprises any modifications within the scope of the appended claims.

What is claimed is:

1. A device for manipulating work members, especially fuel elements and control rods in a core reactor, comprising; a work platform mountable bodily in the horizontal direction and having a hole therethrough on a vertical axis, a mast on said axis extending through said hole, bearing means supporting said mast on said platform for rotation of the mast on the said axis, said mast having a workpiece gripping mechanism nonrotatably but reciprocably mounted therein, a first latch body nonrotatably but vertically movable on the mast on the outside thereof and above said platform, a second latch body fixed to said platform for cooperation with said first latch body and comprising circumferentially spaced regions which align with said first latch body in predetermined rotated positions of said mast, and bolt actuating means operable for moving said first latch body on said mast to effect positive engagement thereof with a said region of said second latch body in each of said rotated positions of said mast, said bolt actuating means also being operable for moving said first latch body on said mast to effect disengagement thereof from the region enaged thereby to permit rotation of said mast to another rotated position thereof.

2. A device according to claim 1 in which said first latch body comprises a bolt, a tubular guide on the mast in which the bolt is guided in vertical reciprocating movement, a roller on the lower end of said bolt, said second latch body comprising an annular portion of said platform engageable by said roller, and said regions comprising recesses formed in said annular portion into which the lower end of said bolt drops in the said rotated positions of said mast.

3. A device according to claim 2 in which said platform includes a top plate having said annular portion thereon, said recesses comprising holes in said plate and said socket members on the underside of said plate aligned with said holes.

4. A device according to claim 2 in which said annular portion includes inclined ramps formed therein and leading downwardly toward said recesses from both sides thereof.

5. A device according to claim 2 in which said bolt actuating means includes a sleeve member surrounding said mast and vertically movable therein and connected to the upper end of said bolt, and levers pivoted to said mast and connected to said sleeve for vertical movement of the sleeve and bolt on the mast.

6. A device according to claim 5 in which said levers are swingable on the mast in axial planes thereof and are substantially vertical in the lowered position of said sleeve and substantially horizontal in the elevated position of said sleeve.

7. A device according to claim 1 which includes cooperating elements of abutment means on said mast and platform for limiting the rotary movement of the mast on the platform to about 360°.

8. A device according to claim 7 in which said abutment means comprises a first abutment body on said mast having abutment regions thereon facing in respective circumferential directions, and a second abutment body on said platform also having oppositely facing abutment regions for engagement with the abutment regions on the first abutment body, one of said abutment bodies having a lost motion connection with the one of said mast and platform to which it is connected.

9. A device according to claim 8 in which said second abutment body is a lever pivotally mounted on said platform on a pivot axis radial to the mast and having limited freedom of movement on said pivot axis, said first abutment body comprising a lug on the mast protruding radially therefrom to within the axial and radial range of the free end of said lever.

10. A device according to claim 1 in which said platforms comprise horizontal plate means and a support ring above said plate means supporting said bearing means, and adjustable means supporting said support ring on said plate means.

11. A device according to claim 10 in which said adjustable means includes opposed arcuate sockets on the underside of said ring and on the top of said plate means, elements seated in said sockets and threaded together for relative adjustment, and bolt means threaded axially into at least one of said elements and engaging the respective one of said plate means and ring for locking the elements in adjusted positions thereon.

* * * * *